US011321523B2

(12) United States Patent
Sivaji et al.

(10) Patent No.: US 11,321,523 B2
(45) Date of Patent: *May 3, 2022

(54) SYSTEMS AND METHODS FOR APPLYING LAYOUT TO DOCUMENTS

(71) Applicant: Google LLC, Mountain View, CA (US)

(72) Inventors: Vishnu Sivaji, New York, NY (US); Andrea Dulko, Brooklyn, NY (US); Li-Wei Lee, Brooklyn, NY (US); Peter Likarish, Jersey City, NJ (US); Julian Rajeshwar, New York, NY (US); Steven Joseph Saviano, Brooklyn, NY (US); Jonathan Bronson, Brooklyn, NY (US); Aaron Zemach, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/927,718

(22) Filed: Jul. 13, 2020

(65) Prior Publication Data

US 2020/0342167 A1 Oct. 29, 2020

Related U.S. Application Data

(63) Continuation of application No. 15/365,459, filed on Nov. 30, 2016, now Pat. No. 10,713,430.

(51) Int. Cl.
*G06F 3/048* (2013.01)
*G06F 40/186* (2020.01)
(Continued)

(52) U.S. Cl.
CPC .......... *G06F 40/186* (2020.01); *G06F 3/0482* (2013.01); *G06F 3/04845* (2013.01); *G06F 16/958* (2019.01); *G06F 40/106* (2020.01)

(58) Field of Classification Search
CPC .... G06F 40/186; G06F 40/106; G06F 16/958; G06F 3/0482; G06F 3/04845
(Continued)

(56) References Cited

U.S. PATENT DOCUMENTS 5,953,733 A 9/1999 Langford-Wilson
8,078,963 B1 * 12/2011 Rosner ................. G06F 40/186
715/255

(Continued)

OTHER PUBLICATIONS

PCT International Search Report and Written Opinion for International Application No. PCT/US2017/054617 dated Jan. 19, 2018, 12 pages.

(Continued)

*Primary Examiner* — Hassan Mrabi
(74) *Attorney, Agent, or Firm* — Lowenstein Sandler LLP

(57) ABSTRACT

A presentation document is provided for display at a user device. An addition of a content object into the presentation document is identified. A theme of the presentation document is identified based on the content object. A subset of the presentation document templates is provided for selection based on the identified theme. A user interaction associated with the presentation document is identified. Responsive to identifying the user interaction associated with the presentation document, suggested content for insertion into the presentation document are provided for presentation at the user device. A selection of a suggested content object from the suggested content is received. The selected suggested content object is applied to the presentation document.

20 Claims, 14 Drawing Sheets

(51) Int. Cl.
*G06F 16/958* (2019.01)
*G06F 40/106* (2020.01)
*G06F 3/0482* (2013.01)
*G06F 3/04845* (2022.01)

(58) Field of Classification Search
USPC .......................................................... 715/732
See application file for complete search history.

(56) References Cited

U.S. PATENT DOCUMENTS

| | | | | |
|---|---|---|---|---|
| 8,990,672 | B1* | 3/2015 | Grosz | G06F 40/106 715/202 |
| 9,135,663 | B1* | 9/2015 | Heiferman | G06F 3/0482 |
| 9,264,462 | B2* | 2/2016 | Heiferman | H04L 12/1818 |
| 9,767,199 | B2 | 9/2017 | Mizuno et al. | |
| 10,033,767 | B2* | 7/2018 | Pashman | H04W 4/025 |
| 10,325,013 | B2* | 6/2019 | Mondal | G06F 16/9535 |
| 10,742,433 | B2* | 8/2020 | Whalin | G06Q 10/10 |
| 2002/0087352 | A1* | 7/2002 | Armstrong | G06Q 30/02 705/1.1 |
| 2005/0084232 | A1* | 4/2005 | Herberger | G11B 27/031 386/282 |
| 2006/0161850 | A1* | 7/2006 | Seaberg | G06F 40/186 715/744 |
| 2006/0271691 | A1 | 11/2006 | Jacobs et al. | |
| 2007/0038567 | A1* | 2/2007 | Allaire | H04N 21/812 705/50 |
| 2007/0079236 | A1* | 4/2007 | Schrier | G06F 40/186 715/206 |
| 2008/0270358 | A1* | 10/2008 | Chatow | G06F 16/951 |
| 2010/0017371 | A1* | 1/2010 | Whalin | G06Q 10/06 707/E17.014 |
| 2010/0095204 | A1 | 4/2010 | Kobayashi | |
| 2011/0029860 | A1 | 2/2011 | Ptucha et al. | |
| 2011/0072035 | A1* | 3/2011 | Gaucas | G06Q 10/10 707/769 |
| 2011/0161130 | A1* | 6/2011 | Whalin | G06Q 30/02 705/7.18 |
| 2011/0239158 | A1* | 9/2011 | Barraclough | G06F 9/451 715/808 |
| 2011/0280497 | A1* | 11/2011 | Berger | G06F 16/54 382/306 |
| 2011/0289142 | A1* | 11/2011 | Whalin | G06Q 10/10 709/203 |
| 2011/0289433 | A1* | 11/2011 | Whalin | G06Q 30/02 715/753 |
| 2011/0305433 | A1* | 12/2011 | Singer | H04N 21/47202 386/248 |
| 2012/0117473 | A1 | 5/2012 | Han et al. | |
| 2012/0179980 | A1* | 7/2012 | Whalin | G06Q 30/02 715/753 |
| 2012/0179981 | A1* | 7/2012 | Whalin | H04W 4/21 715/753 |
| 2012/0277914 | A1* | 11/2012 | Crow | G11B 27/034 700/259 |
| 2012/0278704 | A1* | 11/2012 | Ying | G06F 40/166 715/243 |
| 2012/0294514 | A1* | 11/2012 | Saunders | G06K 9/00677 382/159 |
| 2013/0211980 | A1* | 8/2013 | Heiferman | G06Q 50/01 705/30 |
| 2013/0212494 | A1* | 8/2013 | Heiferman | H04L 51/00 715/753 |
| 2014/0013217 | A1* | 1/2014 | Hashii | G06F 40/106 715/253 |
| 2014/0092424 | A1* | 4/2014 | Grosz | G06F 3/04845 358/1.15 |
| 2014/0096017 | A1* | 4/2014 | Grosz | G06F 3/0482 715/738 |
| 2014/0109046 | A1* | 4/2014 | Hirsch | G06F 8/60 717/120 |
| 2014/0193047 | A1* | 7/2014 | Grosz | G06Q 10/10 382/118 |
| 2014/0195921 | A1* | 7/2014 | Grosz | G06Q 30/0601 715/738 |
| 2015/0040031 | A1* | 2/2015 | Lee | G06F 3/04842 715/748 |
| 2015/0310520 | A1* | 10/2015 | Donato | G06Q 30/0237 705/14.12 |
| 2016/0055165 | A1* | 2/2016 | Namir | G06F 16/211 715/752 |
| 2016/0092404 | A1 | 3/2016 | Farouki et al. | |
| 2016/0092935 | A1* | 3/2016 | Bradley | G06Q 30/0276 705/14.72 |
| 2016/0224999 | A1* | 8/2016 | Mukherjee | G06F 16/9535 |
| 2016/0275067 | A1* | 9/2016 | Mei | G06F 40/186 |
| 2016/0294762 | A1* | 10/2016 | Miller | H04L 65/4084 |
| 2016/0328789 | A1* | 11/2016 | Grosz | H04N 1/00161 |
| 2017/0060509 | A1* | 3/2017 | Tulasi | G06F 40/169 |
| 2017/0116179 | A1* | 4/2017 | Gagne-Langevin | G06F 40/226 |
| 2017/0139930 | A1* | 5/2017 | Maloney | G06F 40/131 |
| 2017/0185254 | A1* | 6/2017 | Zeng | G06F 3/0482 |
| 2017/0185268 | A1* | 6/2017 | Zeng | G06F 3/04845 |
| 2017/0270078 | A1* | 9/2017 | Rajwat | G06F 40/106 |
| 2017/0270079 | A1* | 9/2017 | Rajwat | G06F 40/106 |
| 2017/0315683 | A1* | 11/2017 | Boucher | G06F 3/0486 |
| 2017/0364981 | A1* | 12/2017 | Simpson | G06Q 30/0643 |
| 2018/0025371 | A1* | 1/2018 | Perriman | G06Q 30/0202 705/7.31 |
| 2018/0025373 | A1* | 1/2018 | Perriman | G06Q 50/01 705/7.11 |
| 2018/0083894 | A1* | 3/2018 | Fung | H04L 51/02 |
| 2018/0114238 | A1* | 4/2018 | Treiser | G06Q 50/01 |
| 2020/0104277 | A1* | 4/2020 | Maloney | H04L 67/06 |

OTHER PUBLICATIONS

Written Opinion of the International Preliminary Examining Authority for International Application No. PCT/US2017/054617 dated Oct. 12, 2018, 5 pages.

* cited by examiner

FIG. 3

SYSTEMS AND METHODS FOR APPLYING LAYOUT TO DOCUMENTS

RELATED APPLICATIONS

This application is a continuation application of U.S. patent application Ser. No. 15/365,459, filed Nov. 30, 2016, the entire content of which are hereby incorporated by reference herein.

BACKGROUND

Existing document editing applications allow users to insert different content in the document. In such applications, the user generally arranges the content in the document to make it look meaningful and appealing to the audience of the document. This can require substantial time and effort on the part of the user to arrange the objects of a presentation document in a meaningful manner. The arrangement of objects in a presentation document involves resizing and rearranging the objects, and, not all users may have the necessary skills to perform these tasks in order to create appealing documents.

SUMMARY

Systems and methods disclosed herein relate to providing templates for a document to a user. A plurality of predefined document templates is stored. At least a first object in the document is detected. A score for each document template in the plurality of document templates is generated by applying a ranking scheme to the document templates, wherein the ranking scheme is based on the first object placed in the document. A first subset of the plurality of document templates based on the respective score for each document template is provided to the user. A selection of a document template from the first subset of the plurality of document templates is received from the user and the selected document template is applied to the first object placed in the document.

Some implementations also include detecting at least a type and metadata for the first object and matching the detected type and metadata of the first object to a second object in each document template in the plurality of document templates to generate a score for each template in the plurality of templates. Another aspect of generating the score comprises analyzing a subject matter of the first object, determining a theme of the document based on the analysis of the subject matter, and matching the determined theme to each document template in the plurality of document templates to generate a score for each document template in the plurality of templates. In another example a user may be provided with a plurality of suggestions to create new objects based on the determined theme of the document. In another aspect, applying the selected document template further comprises resizing and repositioning of the first object placed in the document. Some implementations also include creating objects that are not part of the document but are required for the selected document template to apply the selected document.

In another aspect, the first object may be provided, by a combination of the user and a collaborator, to the document. Another aspect includes receiving a second object at the document, generating a score for each document template in the plurality of document templates, by applying the ranking scheme to the document templates, wherein the ranking scheme is based on the first object placed in the document and the second object placed in the document, and providing to the user, a second subset of the plurality of document templates based on each document template's respective score. In some implementations, a second object is automatically placed in a blank region of the document and the placement of the second object requires cropping of the first object.

In another implementation, templates are provided to a user of a document. According to one aspect, a plurality of predefined document templates is stored. At least a first object placed in the document by the user is detected. A score for each document template in the plurality of document templates is generated, by applying a ranking scheme to the document templates, wherein the ranking scheme is based on the first object placed in the document. A first subset of the plurality of document templates based on each document template's respective score is provided to the user. A selection of a document template from the first subset of the plurality of document templates is received from the user and the selected document template is applied to the first object placed in the document.

BRIEF DESCRIPTION OF THE DRAWINGS

Further features of the disclosure, its nature and various advantages will be apparent upon consideration of the following detailed description, taken in conjunction with the accompanying drawings, in which like reference characters refer to like parts throughout, and in which:

FIGS. 2-4 are exemplary depictions of user interfaces for applying a template from a plurality of templates to a presentation document, according to an illustrative implementation;

DETAILED DESCRIPTION

To provide an overall understanding of the disclosure, certain illustrative implementations will now be described, including systems and methods for applying a layout to documents. In particular, the application of a layout comprising providing possible layouts for content present in a document is described. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. Generally, the computerized systems described herein may comprise one or more engines, which include a processing device or devices, such as a computer, microprocessor, logic device or other device or processor that is configured with hardware, firmware, and software to carry out one or more of the computerized methods described herein.

The present disclosure provides systems and methods for applying a layout to data present in documents. The systems and methods described herein analyze the content present in the document and provide suggestions to layout the content based on the analysis. The systems and methods described herein can also rearrange the content of the document when the selected layout is applied. By providing a layout for the content present in the document, effort on the part of the user in resizing and modifying the objects in making the presentation is reduced. The systems and methods of the present disclosure are described herein in the context of a web-based storage system, which may communicate with other systems over a network to store and share data. In general, one of ordinary skill in the art will understand that the systems and methods described herein also are applicable to systems that are locally interconnected without departing from the scope thereof.

Figure 1:
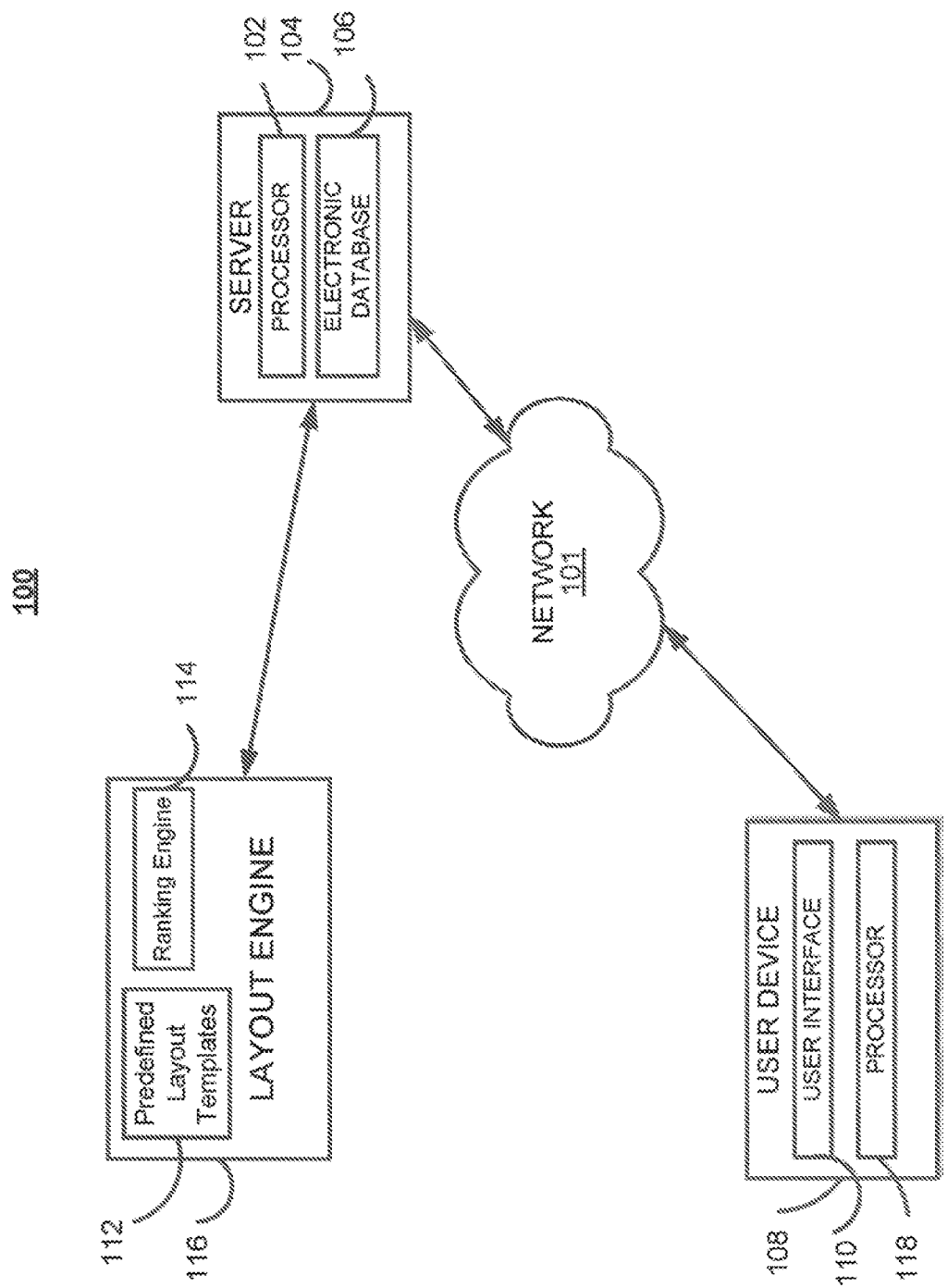
FIG. 1 is a block diagram of a computerized system for applying a layout to a document, according to an illustrative implementation.

FIG. 1 is a block diagram of a computerized system 100 for applying a layout to content in a document based on the content in the document, according to an illustrative implementation. The system 100 includes a server 104, a layout engine 116, and a user device 108 that communicate with one another over a network 101.

As is depicted in FIG. 1, the user device 108 includes a device such as a personal computer, a laptop computer, a tablet, a smartphone, a personal digital assistant, or any other suitable type of computer or communication device. Users at the user device 108 access and receive information from the server 104 and layout engine 116 over the network 101 using processor 118. The user device 108 may include components, such as an input device and an output device. A user may authenticate with the server 104 by inputting a username and password (or providing other identification information) via a user interface 110, such that the same user device 108 may be used by different users at different times.

The layout engine 116 stores predefined layout templates 112 and ranking engine 114 that are used by the layout engine to determine a set of layout templates that may be applied to content present in a document. A predefined layout template is a document template that defines a layout for content in a document. In some implementations, the predefined layout templates 112 are generated by the developers of a document editing application. The document editing application may be used to edit the contents of the document. The document editing application may be executed on the server 104 or user device 108. The predefined layout templates 112 cover a wide range of arrangements of different combinations of objects that may be placed in a document. A document is composed of various objects. For example, the document may contain text, images, videos and audio components. Each of these different components is a different object in the document. In some implementations, some objects may be further divided. The text object may be further divided in terms of paragraphs, pages or lists for example. The different predefined layout templates 112 are filtered and ranked by ranking engine 114 before being presented to the user. The predefined layout templates 112 are filtered based on one or more fields. In some implementations, the fields may be metadata related to the objects present in the document such as, a number of objects placed in the document, a type of the objects placed in the document, a determined theme of the document, for example. In some embodiments, the ranking engine 114 generates a score for each predefined layout template based on the fields and presents the predefined layout templates to the user in an order based on the computed scores.

The server 104 provides updates and maintains synchronization of information between the user device 108 and the layout engine 116. As shown in FIG. 1, the server 104 contains an electronic database 106 and processor 102 that keep track of the various documents associated with a user. In some implementations, the electronic database 106 may be used to store various documents associated with a user at the server 104. The user associated with access to user device 108 may access data stored in the electronic database 106 of the server 104, by entering some authenticating information at the user device 108 to establish a secure connection with the server 104 over network 101. The server 104 also establishes a connection with layout engine 116 to provide the user device 108 access to the layout engine 116. This ensures that server 104 and layout engine 116 have documents stored for multiple users, and that this data can be accessed at any time from any user device 108 as long as a secure connection with the server 104 is established. This allows for multiple users to be associated with the same user device 108. In some implementations, the data associated with various users associated with user device 108 may be stored locally at user device 108, or at a location remote to the user device 108 and server 104. One of ordinary skill in the art will understand that FIG. 1 is shown for illustrative purposes only and that the layout engine 116 may have more components than predefined layout templates 112 and ranking engine 114. In some implementations, the layout engine 116 may be a part of server 104 or user device 108, or the training engine may be remote to the server 104 or user device 108 or both.

A presentation document may be used in this disclosure as an example document type for applying a layout template. In some implementations, a presentation document is a document containing text and pictures that may be animated for conveying information to multiple users. However, one of skill in the art may understand that the methods and systems described herein may be applied to documents of various formats, such as text documents, spreadsheets, portable document formats for example.

Figure 2:
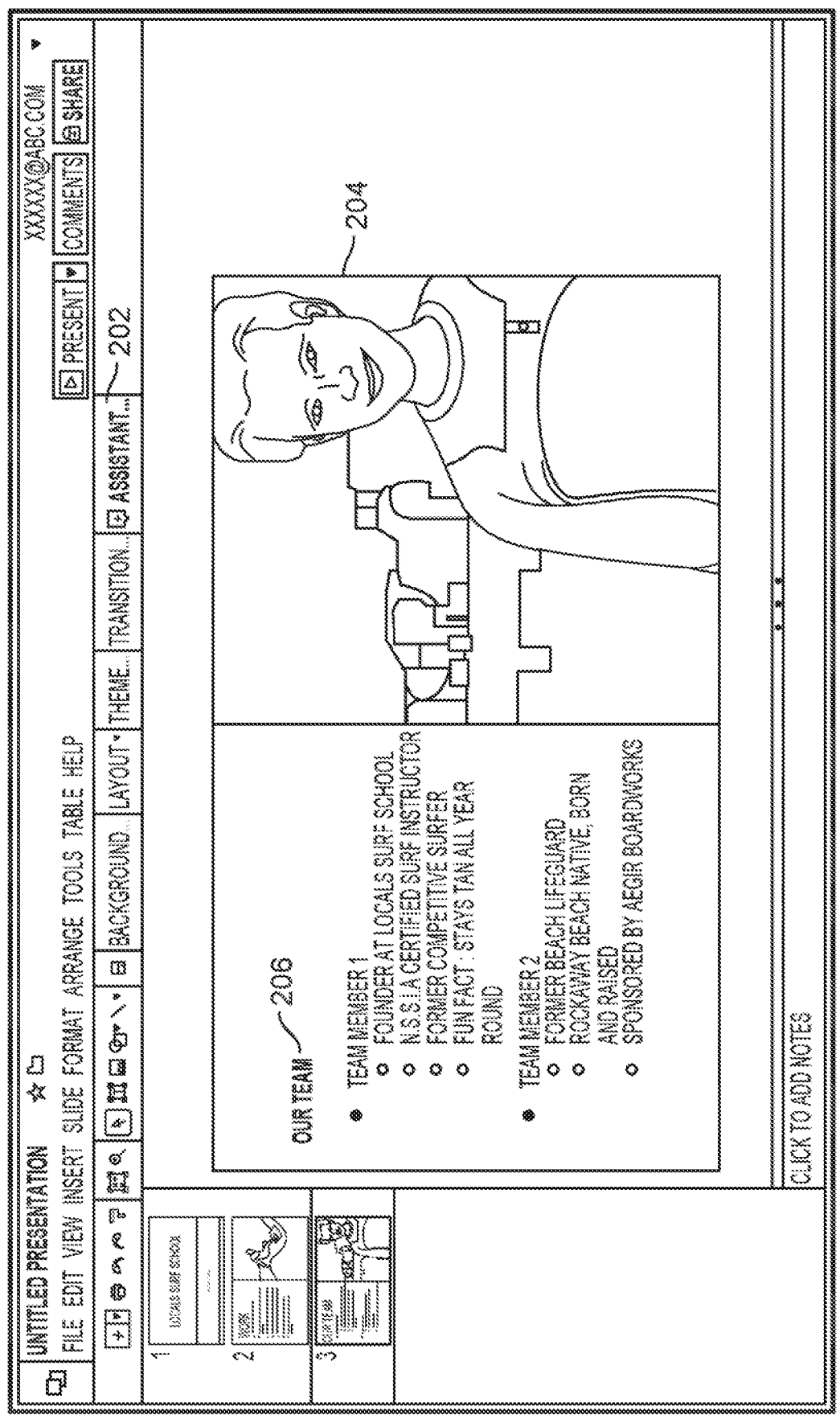

FIG. 2 is an exemplary depiction of a user interface of presentation document 200, according to an illustrative implementation. FIG. 2 depicts the interface of a presentation application where the user has added content to the document. For example, the user has added content (e.g., objects), such as an image 204 and text box 206, to the document. In some implementations, the content added by the user may be arranged by the user. In some implementations, the content added by the user may not be arranged by the user in the document. The content added to the document is analyzed by the layout engine 116 and an indication of the analysis is shown when an assistant button 202 is highlighted in the presentation interface. One of skill in the art may understand that the indication of the analysis may be depicted by many ways including a change in color, font and style of the assistant button 202, or any other type of user interface element. In some embodiments, the assistant may be part of a menu or be depicted in a different portion of the interface.

Figure 3:
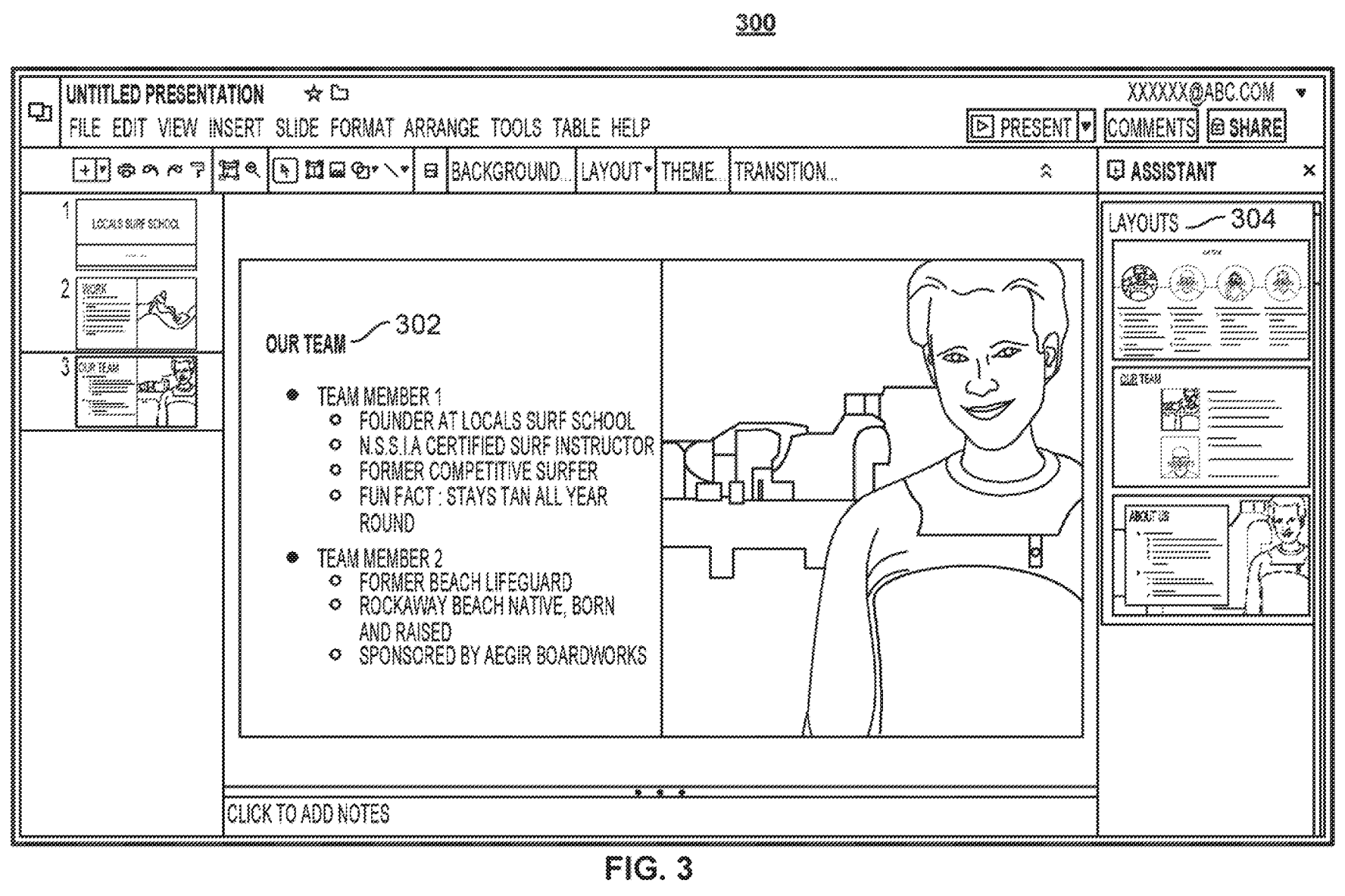

FIG. 3 is an exemplary depiction of a user interface of a presentation document 300 for a presentation document 300 including one or more suggested layout templates based on the content provided, according to an illustrative implementation. FIG. 3 is similar to FIG. 2, except that FIG. 3 includes a suggestion of predefined layout templates 304 provided to the user. The suggestion of predefined layout templates is generated when the user selects the button 202 highlighted in FIG. 2. The suggestion of the templates is based on the analysis of the textbox and image inserted in the document in FIG. 2. The various suggestions in layouts 304 are ordered based on a score calculated for each layout template based on the content present in the document. For example, the text box 302 of the user includes details for Team Member 1 and Team Member 2. Based on the text in the text box, the layout engine 116 examines the predefined layout templates 112 and provides layout templates 304 with suggestions that arrange the content of the text box in a predefined layout template to highlight the qualities of the different team members. In some implementations, the suggested templates may be provided based on the interaction of the user with the document. For example, the user may wish to modify the size, position or orientation of any of the objects already present in the document. The interaction may lead to a modification of the suggested templates. In some embodiments, the user may insert new objects in the document. The insertion of the new objects may also lead to a modification of the suggested templates. In some embodiments, the document may be shared with multiple collaborators, and any of the multiple collaborators may insert an object in the document.

Figure 4:
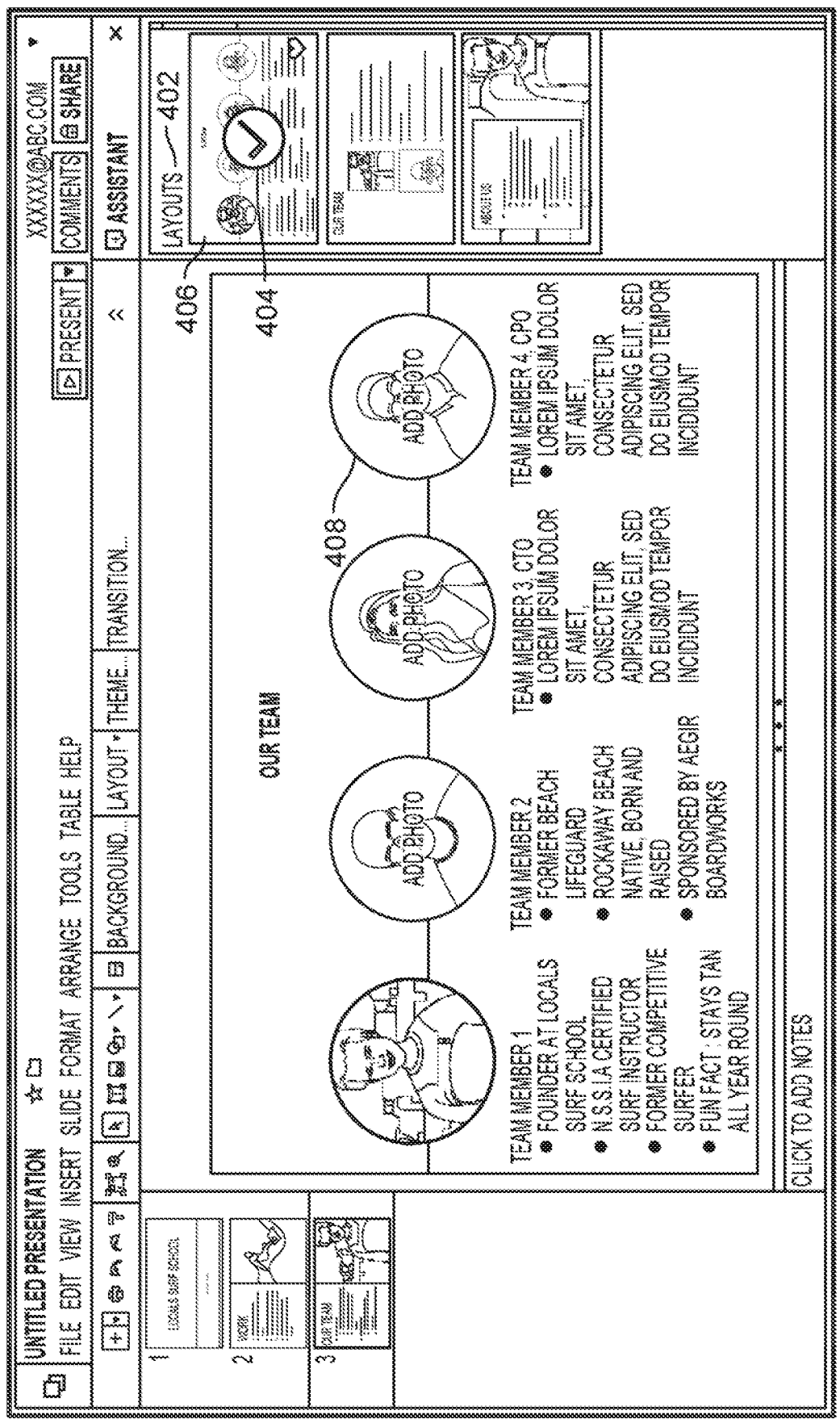

FIG. 4 is an exemplary depiction of a user interface 400 for a presentation document including the application of a selected layout template from one or more suggested layout templates, according to an illustrative implementation. FIG. 4 is the same as FIG. 3, except in FIG. 4, the arrangement of the content on the document has changed based on the selection of a layout template by a user. The tick 404 on the layout template provided in layouts 402 indicates a selection of layout template 406 to be applied to the presentation. One of skill in the art may understand that the indication of the selection of layout template 406 is not limited to tick 404. The selection of layout template 406 may be indicated in many other ways, such as highlighting, color change, and font change, for example. As shown in FIG. 4, space 408 for additional objects in the template may be provided to the user to fill in. For example, in FIG. 4, the space 408 is provided for information regarding additional team members that the user may fill in. Space for different objects may be allocated in suggested layout templates based on the layout and the content inserted into the document.

Figure 5:
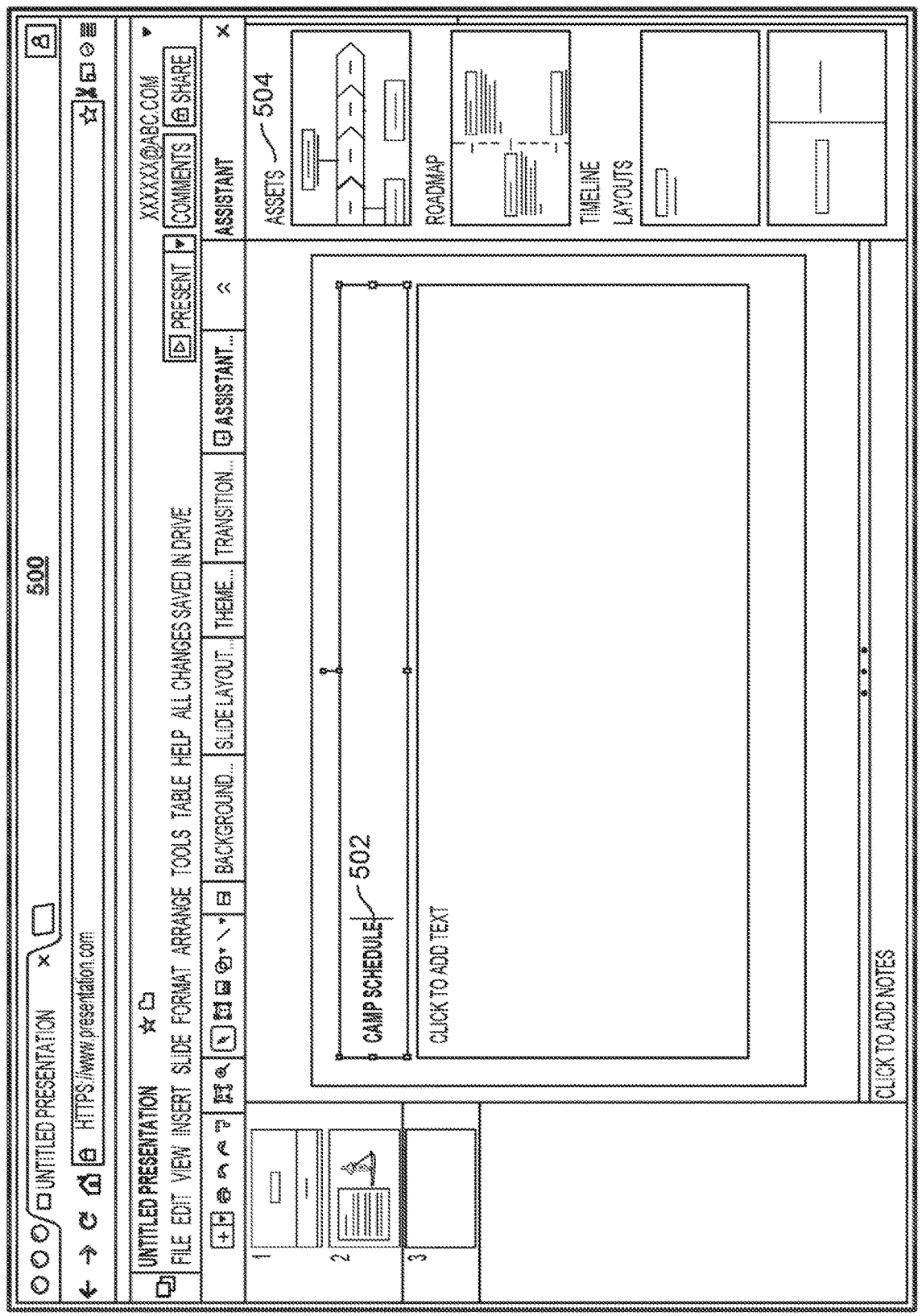
FIGS. 5-6 are exemplary depictions of user interfaces for a document including a plurality of suggested layout templates based on the content provided, according to an illustrative implementation.

FIG. 5 is an exemplary depiction of a user interface 500 for a presentation document including one or more suggested templates (e.g. Assets 504), based on the content provided, according to an illustrative implementation. FIG. 5 depicts providing one or more layout templates by analyzing an object (e.g., text in text box 502) added in the document. The user has added words 'CAMP SCHEDULE' in text box 502. Based on the addition, the layout engine 116 filters the layouts in predefined layout templates 112 to present those layout templates that would help in depicting the document content relating to a camp schedule in a more visually appealing form. In some implementation, the filtering process involves arranging the templates in descending order of the generated score of each template and removing templates that are below a predetermined score level. In some implementations, the layout engine 116 analyzes the document to determine a theme of the document before recommending a set of layout templates to the user for the document. In some implementations, the theme may be determined by analyzing the subject matter associated with objects in the document. As shown in FIG. 5, the text in text box 502 is analyzed and based on the presence of the word 'SCHEDULE' in text box 502 the suggested templates 504 contain templates depicting a timeline or a roadmap. One of skill in the art may understand that the text in text box 502 is for representational purposes only. The user may enter any text there and the layout engine will filter layout templates from the predefined layout templates 112 to provide users with layout templates that will help in representing a schedule.

Figure 6:
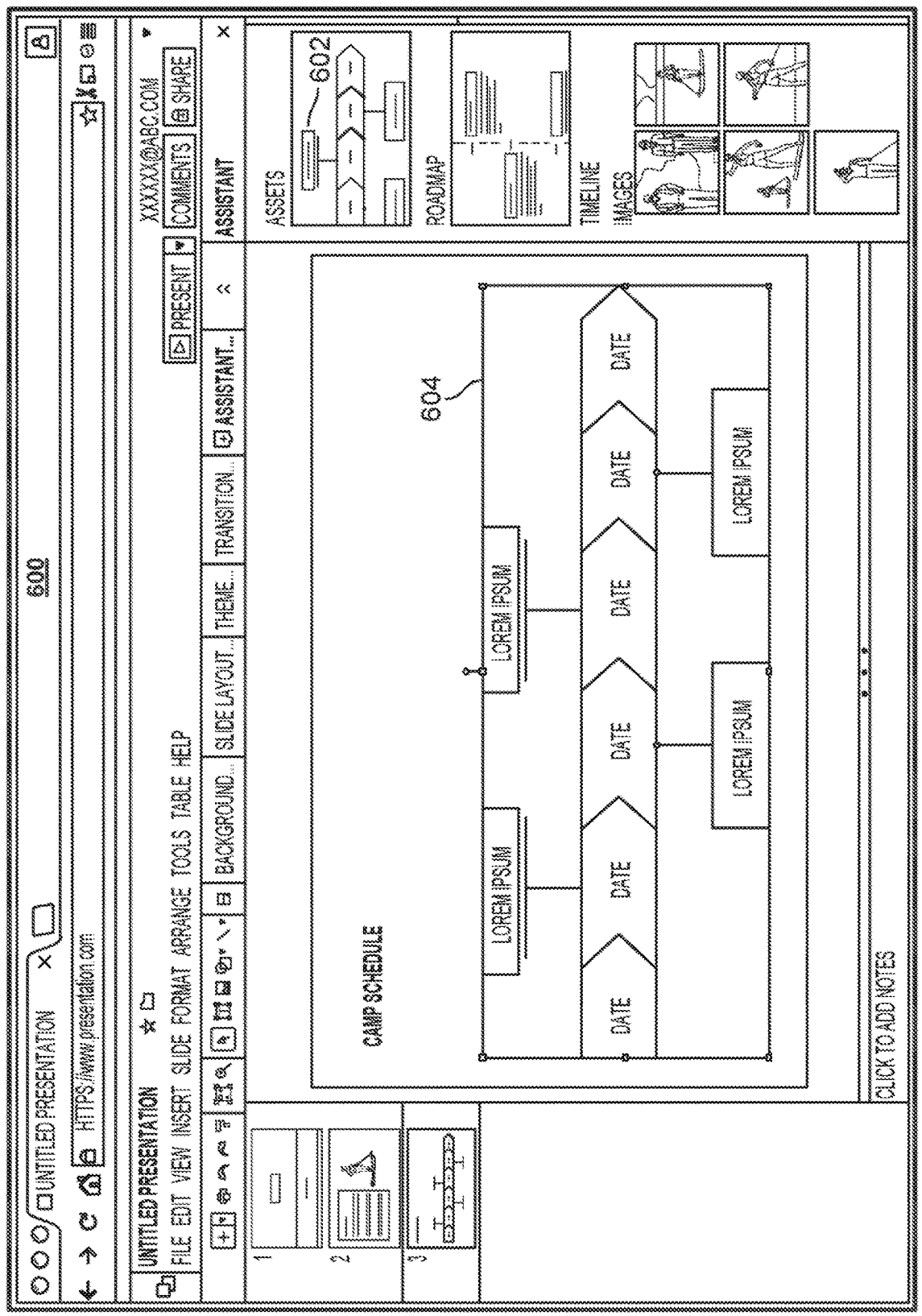

FIG. 6 is an exemplary interface 600 for a presentation document including the application of a selected layout template from one or more suggested layout templates, according to an illustrative implementation. In FIG. 6, the application of the layout template leads to a modification of the presentation of content on the document. In some implementations, the application of the layout template comprises resizing the objects present in the document to conform to the layout of the layout template. In some implementations, the layout engine 116 automatically resizes the objects in the template to conform to the layout of the template. In some implementations, the application of the layout template comprises creating one or more new objects that are not part of the objects added by the user. In some implementations, the layout engine 116 determines objects of the selected template that are not part of the document. In that case, the layout engine 116 automatically generates the objects missing from the document. For example, in FIG. 5, the user adds text box 502 and the application of layout template 602 created the flow chart 604 for the user to populate.

Figure 7:
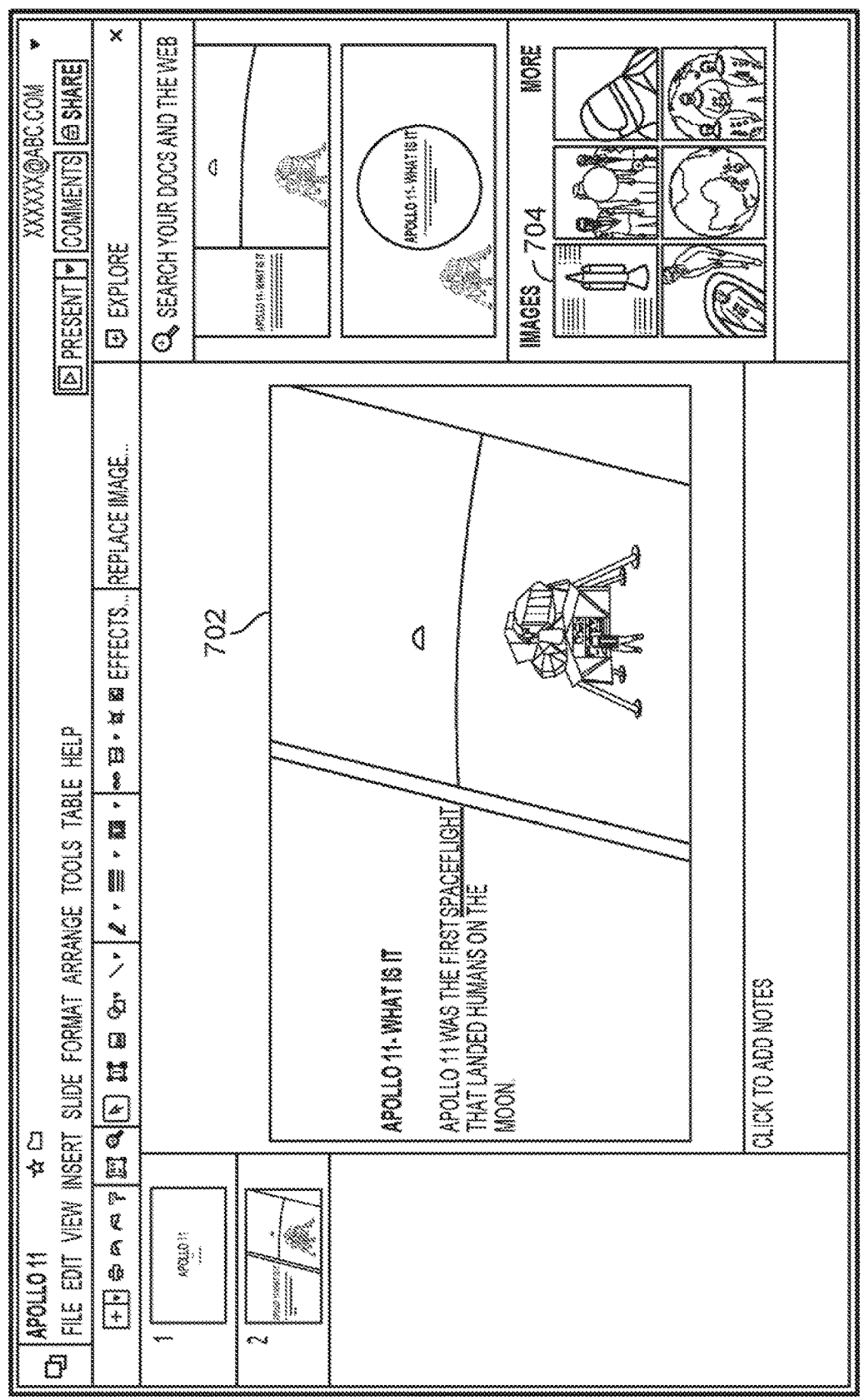
FIG. 7 is an exemplary depiction of a user interface for a document including a plurality of suggested objects based on the content of the document, according to an illustrative implementation.

FIG. 7 is an exemplary interface 700 for a presentation document including suggestions provided by the layout engine 116 to add objects based on a determined theme. Document 702 has content related to Apollo 11. Based on the content 702 provided in the document about Apollo 11, the layout engine 116 has provided image suggestions 704 related to Apollo 11. The suggestions are provided based on the analysis of the objects already present in the document. In some implementations, the objects placed in the document are analyzed. In some implementations, the objects placed in the document are determined to be part of a theme. The analysis of the objects in the document is described in more detail in FIG. 5. The layout engine 116 identified a theme of the document and based on the theme provided the user with a filtered list of image recommendations to be potentially inserted in the document. One of skill in the art may understand that the layout engine 116 may provide various kinds of objects such as text boxes, video files, and audio files in addition to image suggestions to the user of the document.

Figure 8:
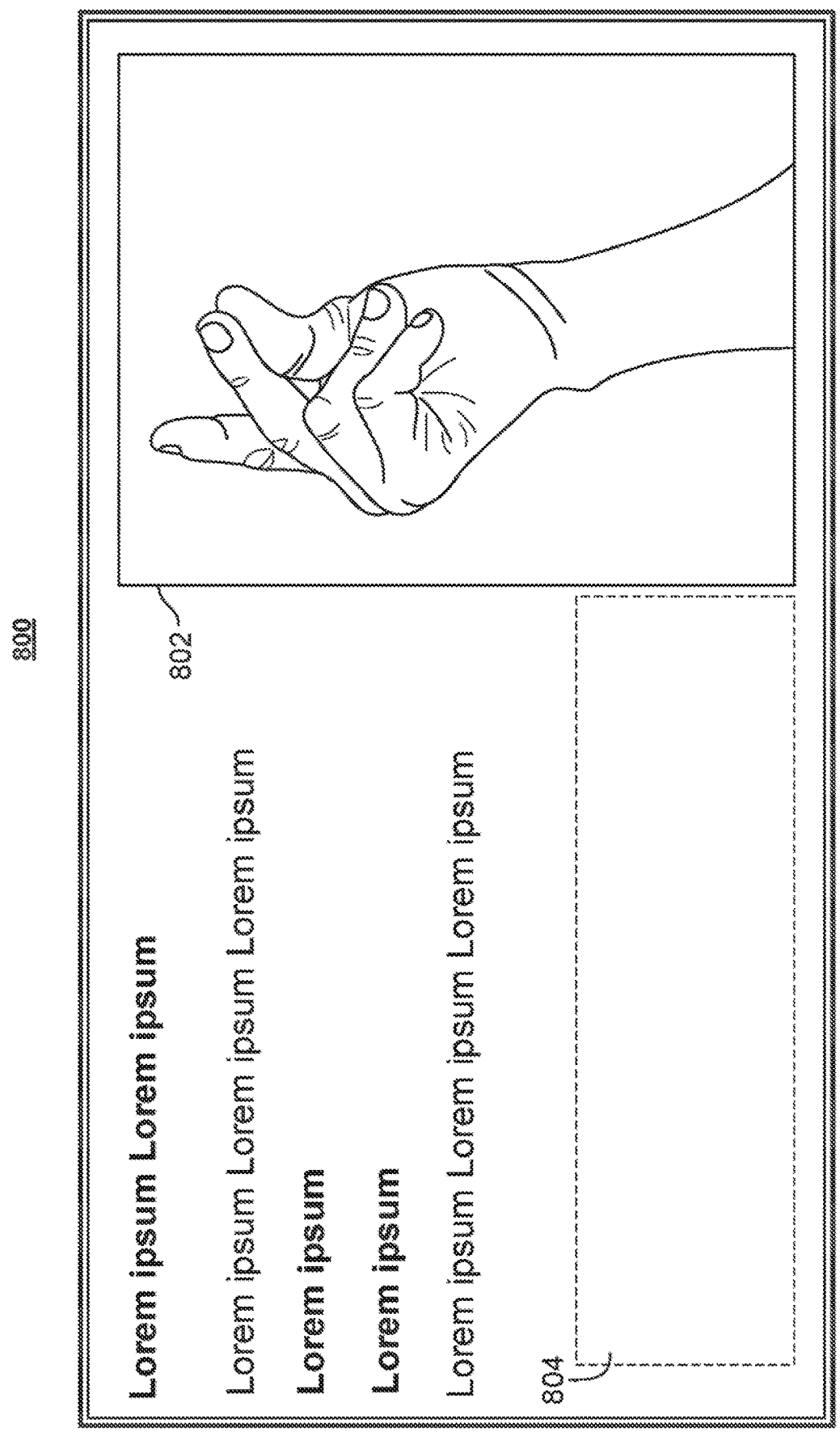
FIGS. 8-10 are exemplary depictions of user interfaces for inserting an image in a document, according to an illustrative implementation.

FIG. 8 is an exemplary interface containing a presentation document 800 including the inserting an image in a blank space (or a white space) in the document. The document already contains image 802 and some text 806 in the document. Upon receiving the command to insert a new image into the document, the layout engine 116 detects a blank region 804 of the document to insert the new image in without disturbing the current arrangement of contents in the document.

Figure 9:
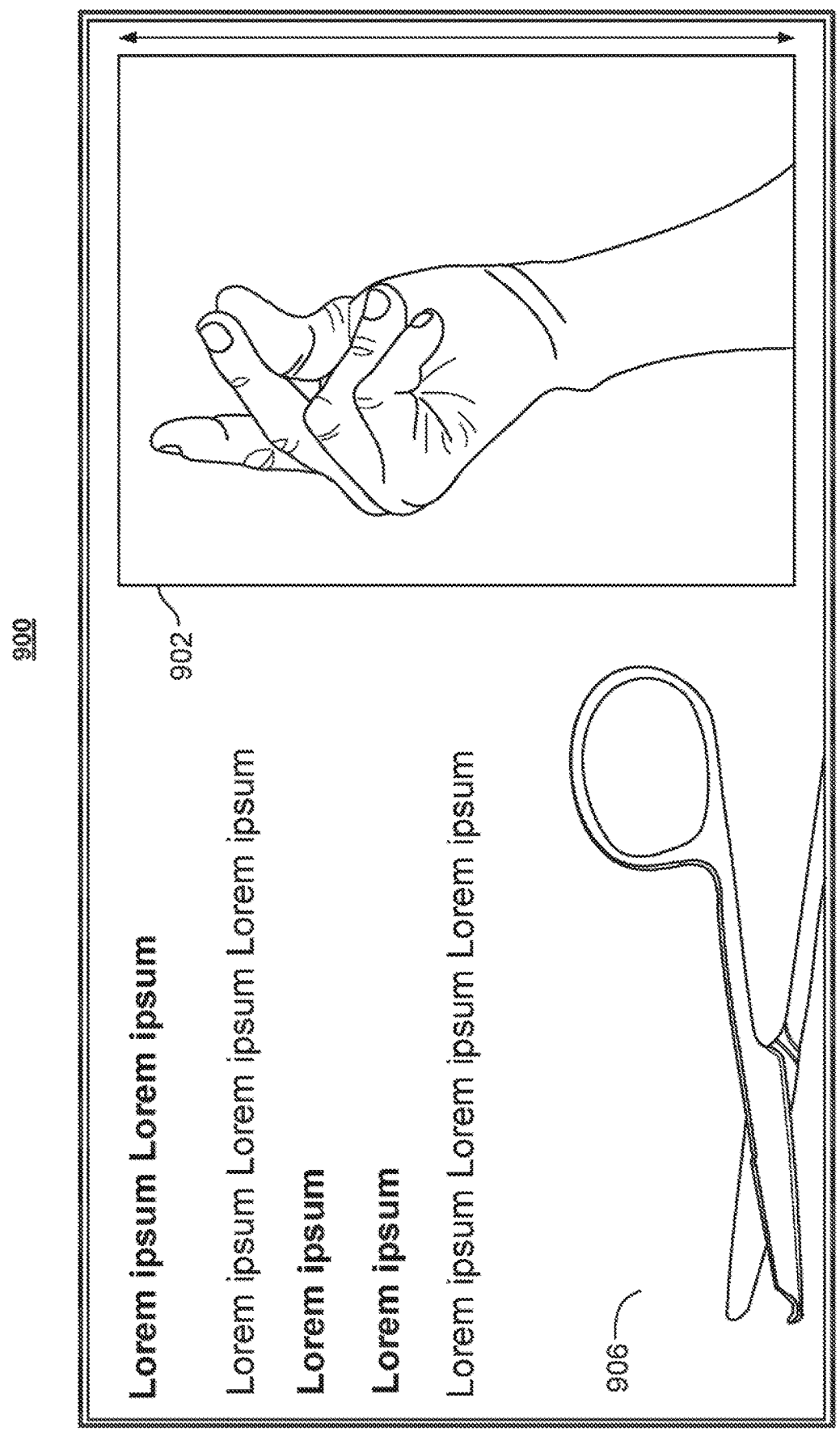

FIG. 9 is an exemplary interface containing a presentation document 900 including the inserting of an image in the blank space in the document. FIG. 9 is the same as FIG. 8, except FIG. 9 has a new image 906 in the previously blank region 804. In some implementations, while inserting the image 906 in the blank region 804 of the document, the size of the image 906 may be modified to fit in the blank region 804. In some implementations, the size of the image 906 may be modified when processor 102 or 118 crops the image 906, and in some implementations, the size of the image 906 may be modified when processor 102 or 118 increases or decreases the size of the image 906 before inserting the resized image in the blank region 804. In FIG. 9, after the insertion of image 906, there is no blank space in the document as detected by the layout engine 116.

Figure 10:
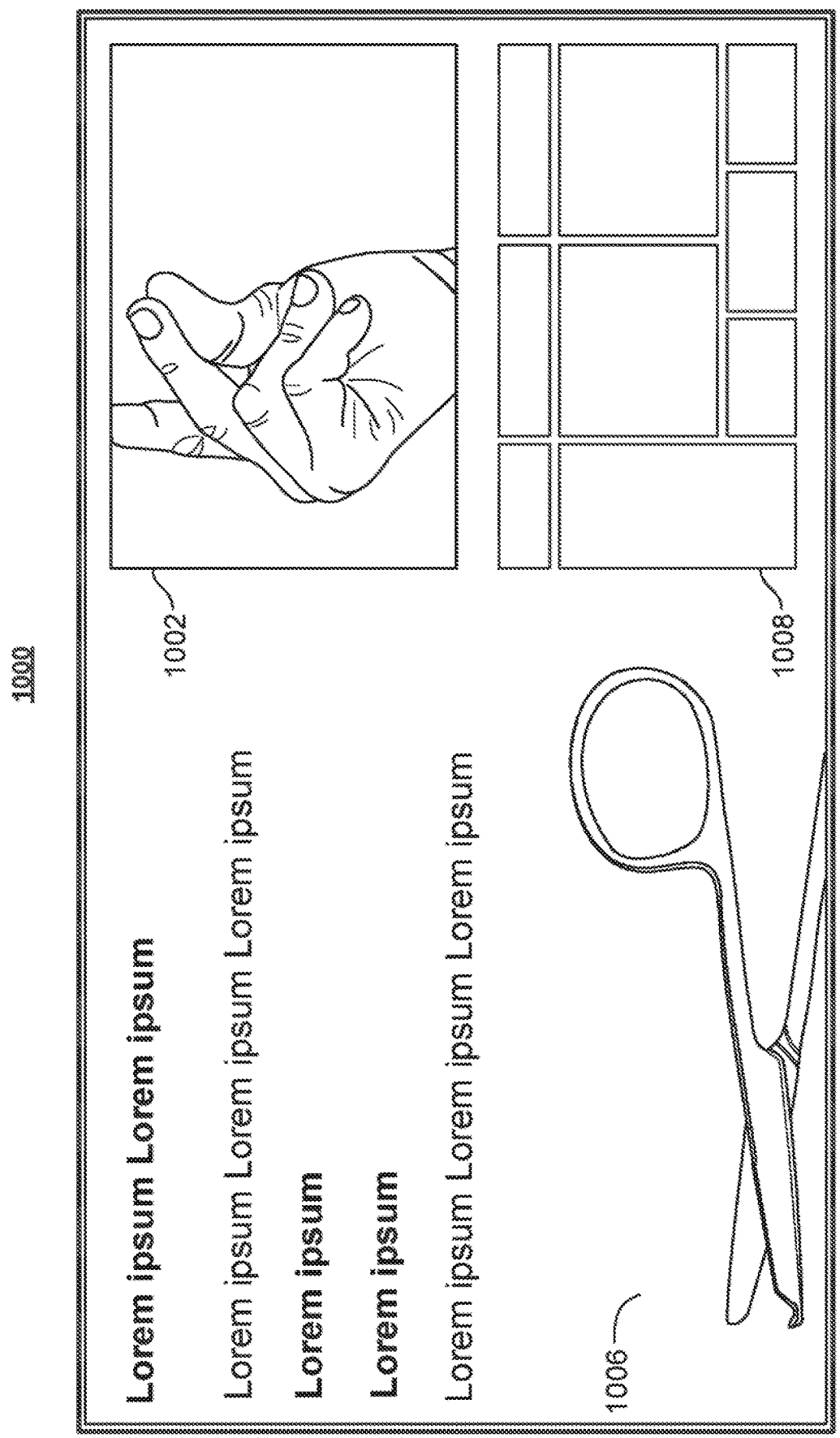

FIG. 10 is an exemplary interface containing a presentation document 1000 including inserting an image in a document with no blank spaces. FIG. 10 is the same as FIG. 9 except there is to be a new image 1008 inserted in FIG. 10. As described with respect to FIG. 9, there is no blank space in the document after the inserting of image 906. To insert a new image 1008 into the document, the layout engine 116 determines that the image 1002 from the set of objects has not been moved, and crops the image 1002 along the longest edge of the image, to create white space for the new image. For example, in FIG. 10, the image 1002 was the object that has not been moved. Thus the layout engine 116 crops the image 1002 along the longest edge to create space to insert image 1008. The location of the cropping is determined keeping in mind the size of the new image 1008 to be inserted. In some implementations, the detected image may be resized to make space for the image. In some implementations, the processor may detect that images 1002 and 1006 have both been moved previously, the processor crops the image moved the earliest to make white space for the image 1008. In some implementations, neither image 1002 nor 1006 may have been moved previously. In that case, the processor crops the image that was inserted first in the document. One of skill in the art will understand that the use of images as objects in FIGS. 8-10 is for exemplary purposes only. The systems and methods described in FIGS. 8-10 may be applied to any type of objects in a document, such as text boxes, videos, charts, for example. In some implementations, the layout engine 116 may crop image 1002 and image 1006 to create space for the insertion of new image 1008.

Figure 11:
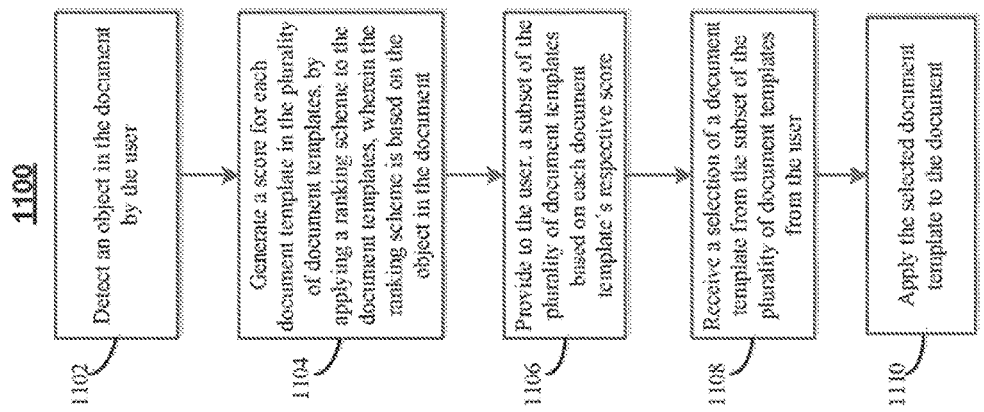
FIG. 11 is a flowchart of a process that applies a selected layout to a document, according to an illustrative implementation.

FIG. 11 is a flowchart of a process 1100 executed by the layout engine 116 to apply a predefined document layout template to a document. The process 1100 may be performed by the layout engine 116, where the layout engine 116 may be executed on user device 108 or server 104. The following description describes the process 1100 as being performed by a processor, which may be any suitable processor on remote database 114, user device 108 and/or server 104. The process 1100 begins at 1102 by detecting an object placed in the document by the user. At 1104, the processor generates a score for each document template in the one or more document templates, by applying a ranking scheme to the document templates, wherein the ranking scheme is generated based on the object placed in the document. At 1106, the processor provides the user with a subset of the one or more document templates based on each document template's respective score. At 1108, the processor receives a selection of a document template from the subset of the one or more document templates from the user. At 1110 the processor applies the selected document template to the document.

At 1102, the processor detects an object in the document by the user. The object placed by the user may be any one of a text box, image, movie file, portable document format file, audio file or any other kind of file. In some implementations, the processor detects a type of metadata associated with the object.

At 1104, the processor generates a score for each document template in the document templates, by applying a ranking scheme to the document templates, wherein the ranking scheme is based on the object placed in the document. The ranking scheme calculates a score by comparing the object placed in the document to objects in the predefined document templates. In some implementations, the processor matches the detected metadata of the object to the metadata of objects in each document template in the predefined document templates in order to generate a score for each template. The score generated for the ranking scheme, takes into account, among other things, the size of the object, the text of the object, the shape of the object among other factors. In some implementations, the layout engine 116 may analyze the subject matter of the object to determine a theme of the document. As described with respect to FIGS. 5-6, the layout engine 116 analyzed the inserted words 'CAMP SCHEDULE' create a list of suggested document layout templates that constituted a time line or a schedule. The determined theme is matched with to the theme of each template in the predefined document templates to generate a score for each template. In some implementations, there may be more than one object inserted in the document.

At 1106, processor provides, via the user interface 110, the user with a subset of the one or more document templates based on each document template's respective score. Based on the computed score for each predefined document template the ranking scheme determines the predefined document templates that had the highest score and filters out the document templates with scores lower than a predetermined threshold out of the list.

At 1108, the processor receives a selection of a document template from the subset of the document templates from the user.

At 1110, the processor applies the selected document template to the document. In some embodiments, the application of the template may comprise, modifying the size, shape and orientation of the object in the document. As described with respect to FIGS. 2-4, the application of the selected template modified the arrangement and size of the text box 206 and the picture 204 present on the document. In some embodiments, the application of the template comprises creating objects that are part of the template but not added by the user. This is discussed in more detail in FIG. 12.

Figure 12:
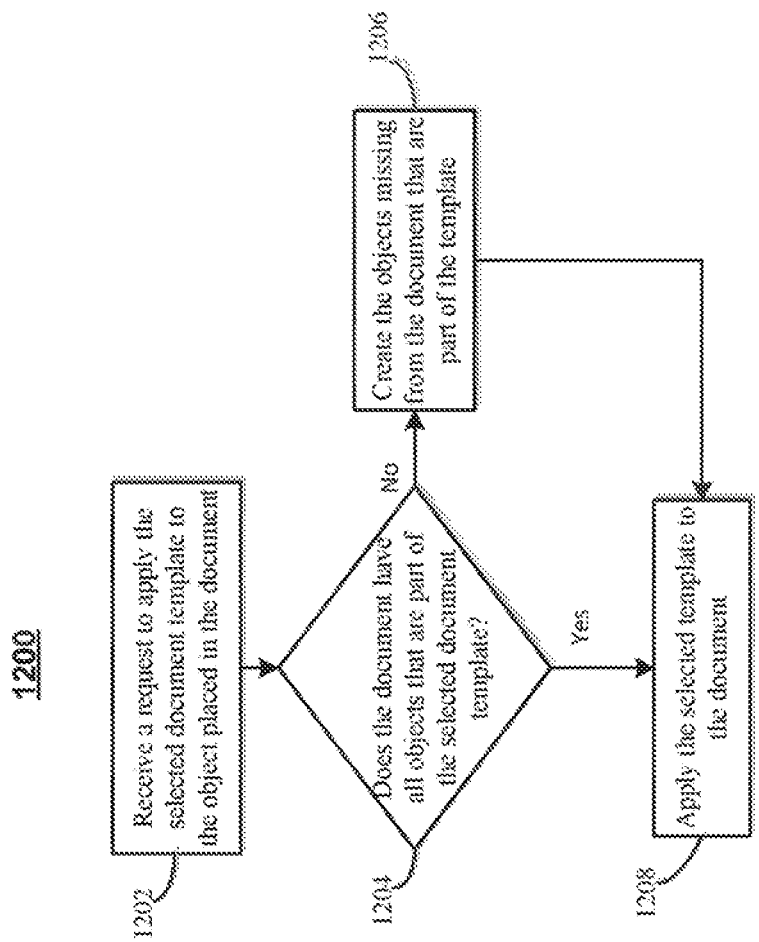
FIG. 12 is a flowchart of a process that automatically inserts an object that is part of a template in the document, according to an illustrative implementation.

FIG. 12 is a flowchart of a process 1200 executed by the layout engine 116 to add an object to an applied predefined document layout template. The process 1200 may be performed by the layout engine 116, where the layout engine 116 may be executed on user device 108 or server 104. The process 1200 begins at 1202 when the processor receives a request to apply the selected document template to the object placed in the document. At 1204, if the document has all objects that are part of the template, at 1208 the processor applies the selected template to the object in the document. Else at 1206 the processor creates one or more objects that are missing from the document that are part of the template to apply the selected template to the object in the document.

At 1202, the processor receives a request to apply the selected document template to the object placed in the document. The request may be in the form of a user selection of a template from a set of templates provided to the user.

At 1204, the processor determines whether the document has all objects that are part of the selected document template. As discussed with respect to FIGS. 5-6, the user selected a roadmap template 306 to be applied to the document based on the text entered in text box 302. The layout engine 116 determines if all the objects of the template are present in the document. If all the objects are not present, at 1206 the processor creates the objects missing from the document that are part of the template. As discussed in FIG. 6, the application of the template comprised creating a roadmap with dummy text 304 which would be populated by the user.

At 1208, the processor applies the selected template to the document, the application of the template as discussed in detail with respect to FIG. 11.

Figure 13:
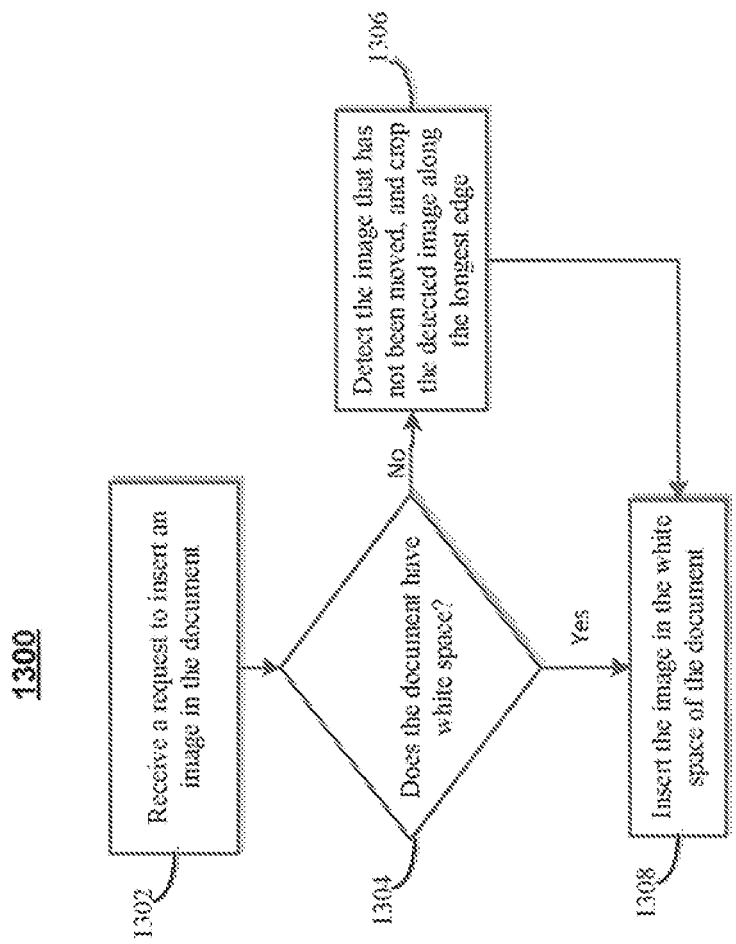
FIG. 13 is a flowchart of a process that automatically inserts images in white spaces of a document, according to an illustrative implementation.

FIG. 13 is a flowchart of a process 1300 executed by the layout engine 116 to insert images in a document. The process 1300 may be performed by the layout engine 116, where the layout engine 116 may be executed on user device 108 or server 104. The process 1300 begins at 1302 when the processor receives a request to insert an image in the document. At 1304, the processor determines whether the document has blank space, i.e., white space, for the image. If the decision determines that there is not enough white space, the processor detects an image that has not been moved, and crops the detected image, along the longest edge of the detected image at 1306 to insert the image in the white space of the document at 1308.

At 1302, the processor receives a request to insert an image in the document. In some implementations, the request may be received in the form of an insert command. In some implementations, the request may be a part of the application of the template document to insert objects on the document.

At 1304, the processor determines whether the document has sufficient white space. In case the document has white space, at 1308 the processor inserts the image in the white space of the document. In some implementations, the white space may not be of the same size as the image to be inserted. In such cases, the image is modified, resized or cropped to fit in the white space available.

In case at 1304, the processor determines that there is insufficient white space in the document, the processor detects an image in the document that has not been moved, and crops the detected image along the longest edge. In some implementations, the detected image may be resized to make space for the image. The processor inserts the image in the white space created. The cropping of existing images is described in more detail with respect to FIGS. 8-10.

The process 1300 of FIG. 13 is described in terms of an image. However, one of skill in the art may understand that process 1300 may be repeated with any other object being added to the document. For example, the user may wish to insert a movie file and the document may already contain text boxes, images and movie files. Process 1300 may detect an object that has not been moved and crop that object along the longest edge to create whitespace for the new image.

Figure 14:
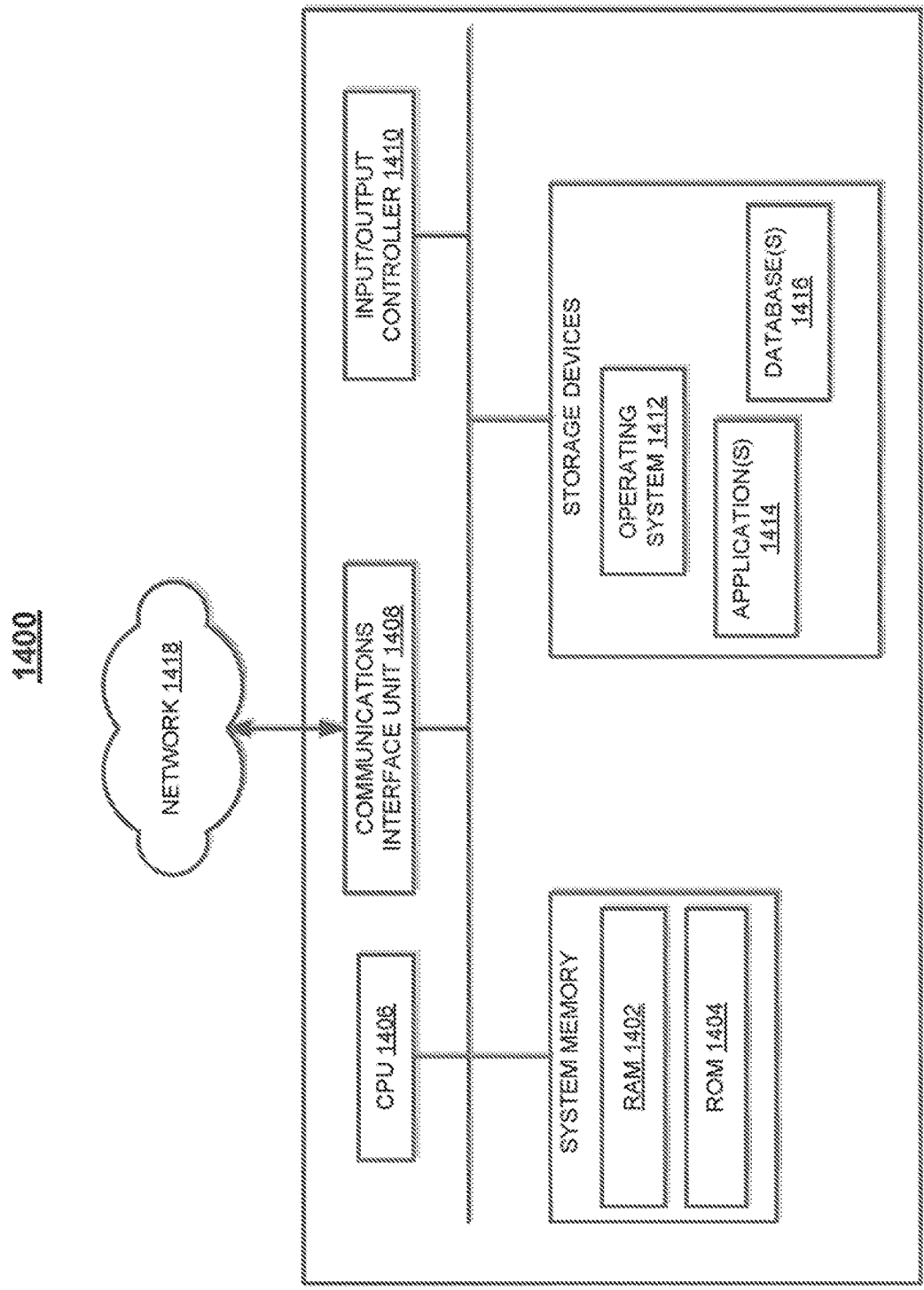
FIG. 14 is a block diagram of a computing device for performing any of the processes described herein, according to an illustrative implementation.

FIG. 14 is a block diagram of a computing device, such as any of the components of the system of FIG. 1, for performing any of the processes described herein. Each of the components of these systems may be implemented on one or more computing devices 1400. In certain aspects, a one or more the components of these systems may be included within one computing device 1400. In certain implementations, a component and a storage device may be implemented across several computing devices 1400.

The computing device 1400 comprises at least one communications interface unit, an input/output controller 1410, system memory, and one or more data storage devices. The system memory includes at least one random access memory (RAM 1402) and at least one read-only memory (ROM 1404). All of these elements are in communication with a central processing unit (CPU 1406) to facilitate the operation of the computing device 1400. The computing device 1400 may be configured in many different ways. For example, the computing device 1400 may be a conventional standalone computer or alternatively, the functions of computing device 1400 may be distributed across multiple computer systems and architectures. In FIG. 14, the computing device 1400 is linked, via network or local network, to other servers or systems.

The computing device 1400 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 1408 to a communications hub or port (not shown) that serves as a primary communication link with other servers, client or user computers and other related devices. The communications hub or port may have minimal processing capability itself, serving primarily as a communications router.

The CPU 1406 comprises a processor, such as one or more conventional microprocessors and one or more supplementary co-processors such as math co-processors for offloading workload from the CPU 1406. The CPU 1406 is in communication with the communications interface unit 1408 and the input/output controller 1410, through which the CPU 1406 communicates with other devices such as other servers, user terminals, or devices. The communications interface unit 1408 and the input/output controller 1410 may include multiple communication channels for simultaneous communication with, for example, other processors, servers or client terminals.

The CPU 1406 is also in communication with the data storage device. The data storage device may comprise an appropriate combination of magnetic, optical or semiconductor memory, and may include, for example, RAM 1402, ROM 1404, flash drive, an optical disc such as a compact disc or a hard disk or drive. The CPU 1406 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 1406 may be connected to the data storage device via the communications interface unit 1408. The CPU 1406 may be configured to perform one or more particular processing functions.

The data storage device may store, for example, (i) an operating system 1412 for the computing device 1400; (ii) one or more applications 1414 (e.g., computer program code or a computer program product) adapted to direct the CPU 1406 in accordance with the systems and methods described here, and particularly in accordance with the processes described in detail with regard to the CPU 1406; or (iii) database(s) 1416 adapted to store information that may be utilized to store information required by the program.

The operating system 1412 and applications 1414 may be stored, for example, in a compressed, an uncompiled and an encrypted format, and may include computer program code. The instructions of the program may be read into a main memory of the processor from a computer-readable medium other than the data storage device, such as from the ROM 1404 or from the RAM 1402. While execution of sequences of instructions in the program causes the CPU 1406 to perform the processes described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to any of the processes as described herein. The program also may include program elements such as an operating system 1412, a database management system and "device drivers" that allow the processor to interface with computer peripheral devices (e.g., a video display, a keyboard, a computer mouse, etc.) via the input/output controller 1410.

The term "computer-readable medium" as used herein refers to any non-transitory medium that provides or participates in providing instructions to the processor of the computing device 1400 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 1406 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 1000 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information. In general one of ordinary skill in the art that the source features, destination features and content of the document are not limited in any way by the examples provided above.

What is claimed is:

1. A method comprising:
   providing, by a processing device, a presentation document having a first layout for display at a user device;
   identifying an addition of a content object inserted into an editable portion of the first layout of the presentation document;
   subsequent to identifying the addition of the content object inserted in the editable portion of the first layout of the presentation document,
      identifying a theme of the presentation document based on the content object inserted into the editable portion of the first layout of the presentation document, and
      providing, for selection, a subset of a plurality of presentation document templates based on the identified theme, wherein at least one of the subset of the presentation document templates defines a second layout that is different from the first layout of the presentation document; and
   identifying a user interaction associated with the presentation document;
   responsive to identifying the user interaction associated with the presentation document, providing, for presentation at the user device, a plurality of suggested content for insertion into the presentation document, wherein the plurality of suggested content is related to the content object inserted into the editable portion of the first layout of the presentation document;
   receiving a selection of a suggested content object from the plurality of suggested content; and
   applying, by a processor, the selected suggested content object to the first layout of the presentation document.

2. The method of claim 1, wherein the plurality of suggested content are related to the content object.

3. The method of claim 2, wherein the plurality of suggested content comprise one or more images that are related to the content object.

4. The method of claim 2, further comprising:
   analyzing the content object of the presentation document, wherein the plurality of suggested content for insertion into the presentation document are based at least in part on the analysis of the content object.

5. The method of claim 1, wherein the content object comprises a text inserted into a text box in the editable portion of the presentation document.

6. The method of claim 1, wherein providing the presentation document for display at the user device comprises:
   providing a graphical user interface (GUI) for presentation at the user device, wherein the GUI comprises a first GUI element provided for presentation of the presentation document.

7. The method of claim 6, wherein providing, for presentation at the user device, the plurality of suggested content for insertion into the presentation document comprises:
   providing within the GUI a second GUI element for presentation of the plurality of suggested content, wherein the second GUI element is presented adjacent to the first GUI element.

8. A system comprising:
   a memory; and
   a processor, coupled to memory, to:
      provide a presentation document having a first layout for display at a user device;
      identify an addition of a content object inserted into an editable portion of the first layout of the presentation document;

subsequent to identifying the addition of the content object inserted in the editable portion of the first layout of the presentation document,
    identify a theme of the presentation document based on the content object inserted into the editable portion of the first layout of the presentation document, and
    provide, for selection, a subset of a plurality of presentation document templates based on the identified theme, wherein at least one of the subset of the presentation document templates defines a second layout that is different from the first layout of the presentation document; and
identify a user interaction associated with the presentation document;
responsive to identifying the user interaction associated with the presentation document, provide, for presentation at the user device, a plurality of suggested content for insertion into the presentation document, wherein the plurality of suggested content is related to the content object inserted into the editable portion of the first layout of the presentation document;
receive a selection of a suggested content object from the plurality of suggested content; and
apply the selected suggested content object to the first layout of the presentation document.

9. The system of claim 8, wherein the plurality of suggested content are related to the content object.

10. The system of claim 9, wherein the plurality of suggested content comprise one or more images that are related to the content object.

11. The system of claim 9, the processor further to:
analyze the content object of the presentation document, wherein the plurality of suggested content for insertion into the presentation document are based at least in part on the analysis of the content object.

12. The system of claim 8, wherein the content object comprises a text inserted into a text box in the editable portion of the presentation document.

13. The system of claim 8,
wherein to provide the presentation document for display at the user device, the processor further to:
    provide a graphical user interface (GUI) for presentation at the user device, wherein a first GUI element is provided for presentation of the presentation document,
wherein to provide, for presentation at the user device, the plurality of suggested content for insertion into the presentation document, the processor further to:
    provide within the GUI a second GUI element for presentation of the plurality of suggested content, wherein the second GUI element is presented adjacent to the first GUI element.

14. A non-transitory computer-readable medium comprising instructions that, responsive to execution by a processor, cause the processor to perform operations comprising:
providing, by the processor, a presentation document having a first layout for display at a user device;
identifying an addition of a content object inserted into an editable portion of the first layout of the presentation document;
subsequent to identifying the addition of the content object inserted in the editable portion of the first layout of the presentation document,
    identifying a theme of the presentation document based on the content object, inserted into the editable portion of the first layout of the presentation document, and
    providing, for selection, a subset of a plurality of presentation document templates based on the identified theme, wherein at least one of the subset of the presentation document templates defines a second layout that is different from the first layout of the presentation document; and
identifying a user interaction associated with the presentation document;
responsive to identifying the user interaction associated with the presentation document, providing, for presentation at the user device, a plurality of suggested content for insertion into the presentation document, wherein the plurality of suggested content is related to the content object inserted into the editable portion of the first layout of the presentation document;
receiving a selection of a suggested content object from the plurality of suggested content; and
applying, by the processor the selected suggested content object to the first layout of the presentation document.

15. The non-transitory computer-readable medium of claim 14, wherein the plurality of suggested content are related to the content object.

16. The non-transitory computer-readable medium of claim 15, wherein the plurality of suggested content comprise one or more images that are related to the content object.

17. The non-transitory computer-readable medium of claim 15, the processor further to perform the operations comprising:
analyzing the content object of the presentation document, wherein the plurality of suggested content for insertion into the presentation document are based at least in part on the analysis of the content object.

18. The non-transitory computer-readable medium of claim 14, wherein the content object comprises a text inserted into a text box in the editable portion of the presentation document.

19. The non-transitory computer-readable medium of claim 14, wherein providing the presentation document for display at the user device, the operations comprising:
providing a graphical user interface (GUI) for presentation at the user device, wherein a first GUI element is provided for presentation of the presentation document.

20. The non-transitory computer-readable medium of claim 19, wherein providing, for presentation at the user device, the plurality of suggested content for insertion into the presentation document, the operations further comprising:
providing within the GUI a second GUI element for presentation of the plurality of suggested content, wherein the second GUI element is presented adjacent to the first GUI element.

* * * * *